(12) United States Patent
Kuo et al.

(10) Patent No.: US 10,549,809 B2
(45) Date of Patent: Feb. 4, 2020

(54) FOLDABLE SCOOTER

(71) Applicant: Ford Global Technologies, LLC, Dearborn, MI (US)

(72) Inventors: James Yu-Hsin Kuo, Farmington Hills, MI (US); Chelsia Ka Po Lau, Ann Arbor, MI (US); Jack Li, Putuo (CN); Hyunsoo Kim, Shelby Township, MI (US); Euishik Bang, Huangpu (CN); Bruce Preston Williams, Grosse Pointe Park, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/087,637

(22) PCT Filed: Jul. 27, 2016

(86) PCT No.: PCT/US2016/044174
§ 371 (c)(1),
(2) Date: Sep. 22, 2018

(87) PCT Pub. No.: WO2017/164915
PCT Pub. Date: Sep. 28, 2017

(65) Prior Publication Data
US 2019/0111988 A1    Apr. 18, 2019

Related U.S. Application Data
(60) Provisional application No. 62/311,962, filed on Mar. 23, 2016.

(51) Int. Cl.
*B62K 3/00* (2006.01)
*B62K 15/00* (2006.01)
(Continued)

(52) U.S. Cl.
CPC ............ *B62K 15/006* (2013.01); *B62K 3/002* (2013.01); *B62K 5/027* (2013.01); *B62K 5/06* (2013.01);
(Continued)

(58) Field of Classification Search
CPC ...... B60K 15/006; B60K 3/002; B60K 5/027; B60K 5/06
See application file for complete search history.

(56) References Cited

U.S. PATENT DOCUMENTS 6,120,044 A * 9/2000 Tsai ................... B62K 15/006
280/639
6,206,387 B1 * 3/2001 Tsai ...................... B62K 3/002
280/87.041
(Continued)

FOREIGN PATENT DOCUMENTS

CN      2706392 Y      6/2005
CN    203467856 U      3/2014
(Continued)

OTHER PUBLICATIONS

Yaish, "Electric scooter on Industrial Design Served", Mar. 25, 2016, http://www.industrialdesignserved.com/gallery/electric-scooter/8605157.
(Continued)

*Primary Examiner* — Hau V Phan
(74) *Attorney, Agent, or Firm* — Brandon Hicks; Bejin Bieneman PLC

(57) ABSTRACT

A scooter includes a lower body with a first end and a second end, a rear wheel rotatably supported by the first end, an elongated front body with a lower end and an upper end, a guide fixed within the front body extending from the lower end to the upper end, an attachment member pivotably fixed to the second end of the lower body and engaged by the
(Continued)

guide, and a front wheel rotatably supported by the lower end.

17 Claims, 16 Drawing Sheets

(51) Int. Cl.
    *B62K 13/08*     (2006.01)
    *B62K 21/16*     (2006.01)
    *B62K 5/06*     (2006.01)
    *B62K 5/027*     (2013.01)

(52) U.S. Cl.
    CPC .............. *B62K 13/08* (2013.01); *B62K 21/16* (2013.01); *B62K 2204/00* (2013.01)

(56) References Cited

U.S. PATENT DOCUMENTS

| | | | |
|---|---|---|---|
| 6,234,501 B1 * | 5/2001 | Chen | C23F 1/46 16/900 |
| 6,378,880 B1 * | 4/2002 | Lin | B62K 3/002 280/87.05 |
| 6,431,567 B2 * | 8/2002 | Tsai | B62K 3/002 280/87.041 |
| 6,443,470 B1 | 9/2002 | Ulrich et al. | |
| 6,619,678 B2 | 9/2003 | van Ardenne | |
| 6,619,679 B2 * | 9/2003 | Lan | B62K 3/002 180/181 |
| 7,419,171 B1 * | 9/2008 | Ka Ming | B62K 3/002 280/87.041 |
| 7,597,333 B2 * | 10/2009 | Stillinger | A63C 17/012 280/87.01 |
| 8,113,525 B2 * | 2/2012 | Lin | B62K 15/006 280/87.041 |
| 8,201,837 B2 * | 6/2012 | Dweek | A45C 5/146 224/153 |
| 8,459,679 B2 * | 6/2013 | Jessie, Jr. | B62K 15/006 280/282 |
| 8,469,374 B2 | 6/2013 | Graf Von Bismarck | |
| 8,887,852 B2 | 11/2014 | Schaap | |
| 9,090,274 B1 | 7/2015 | Arjomand et al. | |
| 2002/0121756 A1 * | 9/2002 | Chen | B62K 3/002 280/87.041 |
| 2002/0145264 A1 * | 10/2002 | Hung | B62K 3/002 280/87.041 |
| 2003/0042711 A1 | 3/2003 | Hsu | |
| 2004/0227318 A1 | 11/2004 | Beleski, Jr. | |
| 2006/0273534 A1 * | 12/2006 | Turner | A45F 3/04 280/30 |
| 2009/0255747 A1 | 10/2009 | Kasaba et al. | |
| 2011/0031711 A1 * | 2/2011 | Grossman | B62J 6/003 280/87.041 |
| 2012/0013089 A1 | 1/2012 | Reeves | |
| 2013/0033012 A1 | 2/2013 | Arjomand et al. | |
| 2014/0107868 A1 | 4/2014 | DiGiacomcantonio et al. | |
| 2015/0327638 A1 | 11/2015 | Ghosh | |
| 2016/0096576 A1 * | 4/2016 | Gotfrid | B62K 15/006 280/641 |

FOREIGN PATENT DOCUMENTS

| | | |
|---|---|---|
| CN | 203558170 U | 4/2014 |
| CN | 204821886 U | 12/2015 |
| CN | 105270536 A | 1/2016 |
| RU | 2406421 C1 | 12/2010 |

OTHER PUBLICATIONS

International Search Report and Written Opinion re PCT/US2016/044174.
RU Office Action (Non-English) dated Nov. 14, 2019 re Appl. No. 2018137069/11(061398) with US translation via Google.
English Translation of CN First Office Action dated 129/2019; re Appl. No. 2016800839502.

* cited by examiner

FOLDABLE SCOOTER

CROSS-REFERENCE TO RELATED APPLICATIONS

This patent application claims priority to and all advantages of U.S. Provisional Patent Application No. 62/311,962, which was filed on Mar. 23, 2016, and which is hereby incorporated by reference in its entirety.

BACKGROUND

With growing populations and a shift toward more urbanization, the population density of cities increases. Users increasingly ride public transportation systems and walk from public transport stations to final destinations. Moreover, many suburban residents now park their cars in parking structures in city centers and walk to their final destination to avoid traffic congestion of city centers.

DETAILED DESCRIPTION

Introduction

Figure 1A:
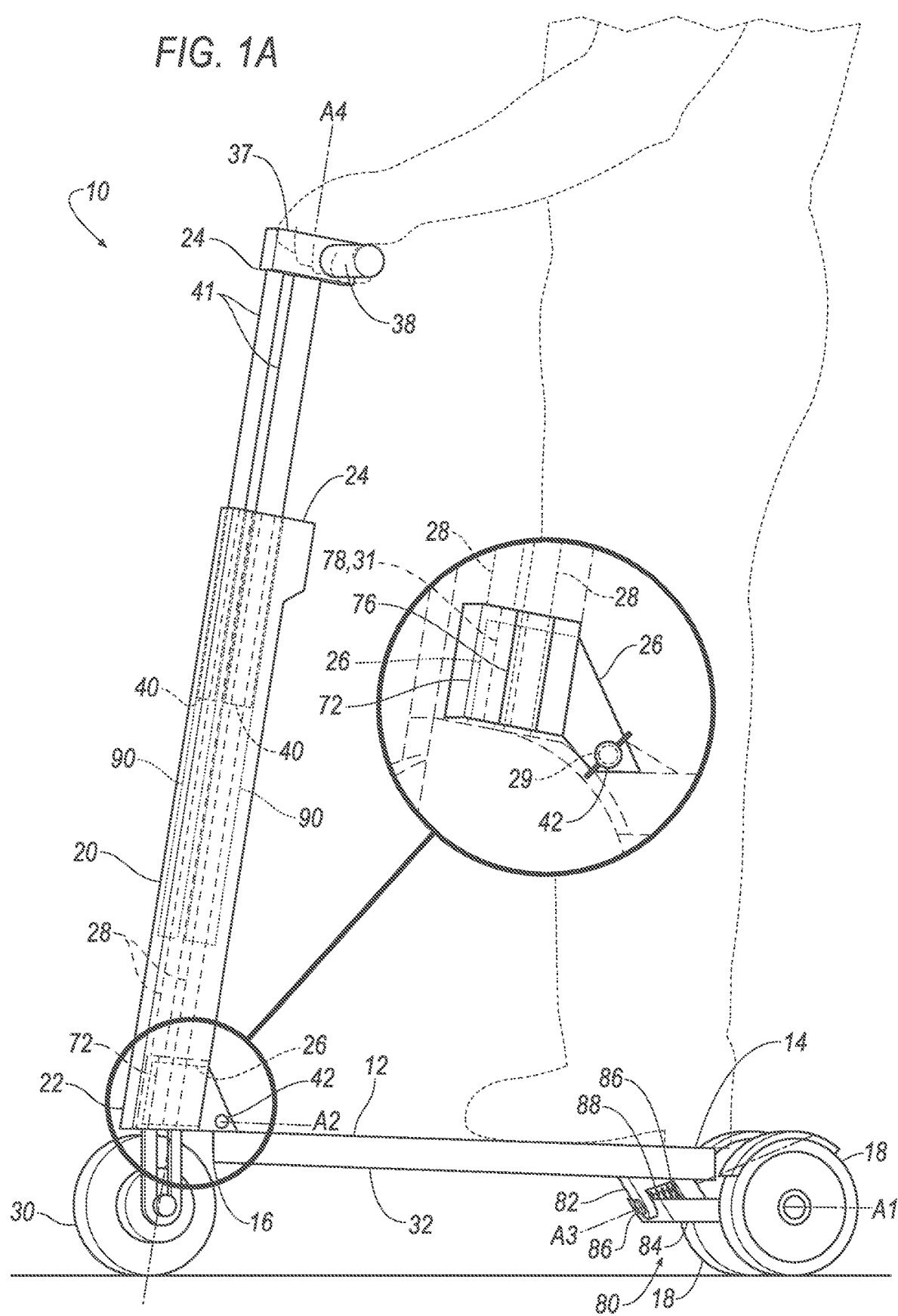
FIG. 1A is a perspective view of an example scooter in a "Go" position.

With reference to the Figures, wherein like numerals indicate like parts throughout the several views, an example scooter 10 includes a lower body 12 with a first end 14 and a second end 16, a rear wheel 18 rotatably supported by the first end 14, an elongated front body 20 with a lower end 22 and an upper end 24, a guide 28 fixed within the front body 20 extending from the lower end 22 to the upper end 24, an attachment member 26 pivotably fixed to the second end 16 of the lower body 12 and engaged by the guide 28, and a front wheel 30 rotatably supported by the lower end 22.

The scooter 10 will typically be used on a ground surface, e.g., a road, sidewalk, walkway, parking lot, etc. When a user rides the scooter 10, parts of the scooter 10 in proximity of the ground surface may become dirty because of dirt, litter or the like on the ground surface. The scooter 10 may be placed in a "Carry" position, e.g., by moving the attachment member 26 toward the upper end 24 of the front body 20 and additionally moving the rear wheel 18 toward the front wheel 30 by pivoting the lower body 12. In the Carry position, a bottom surface 32 of the lower body 12, which typically faces a road when the user rides the scooter 10, is surrounded by the front body 20 and a top surface 34 of the lower body 12. The front body 20 and the top surface 34 of the lower body 12 may be less likely to become dirty compared to the bottom surface 32. Thus, the scooter 10 in the Carry position may reduce the likelihood that clothing of the user holding the scooter 10, or of a person standing next to the user, is exposed to dirt on the bottom surface 32 of the lower body 12. Additionally, placing the front wheel 30 and the rear wheel 18 adjacent one another in the Carry position at the lower end 22 compared to placing the wheels away from one another may reduce the likelihood of exposing the clothing of the user or the person adjacent the user to dirt on the wheels.

System Elements

Figure 2A:
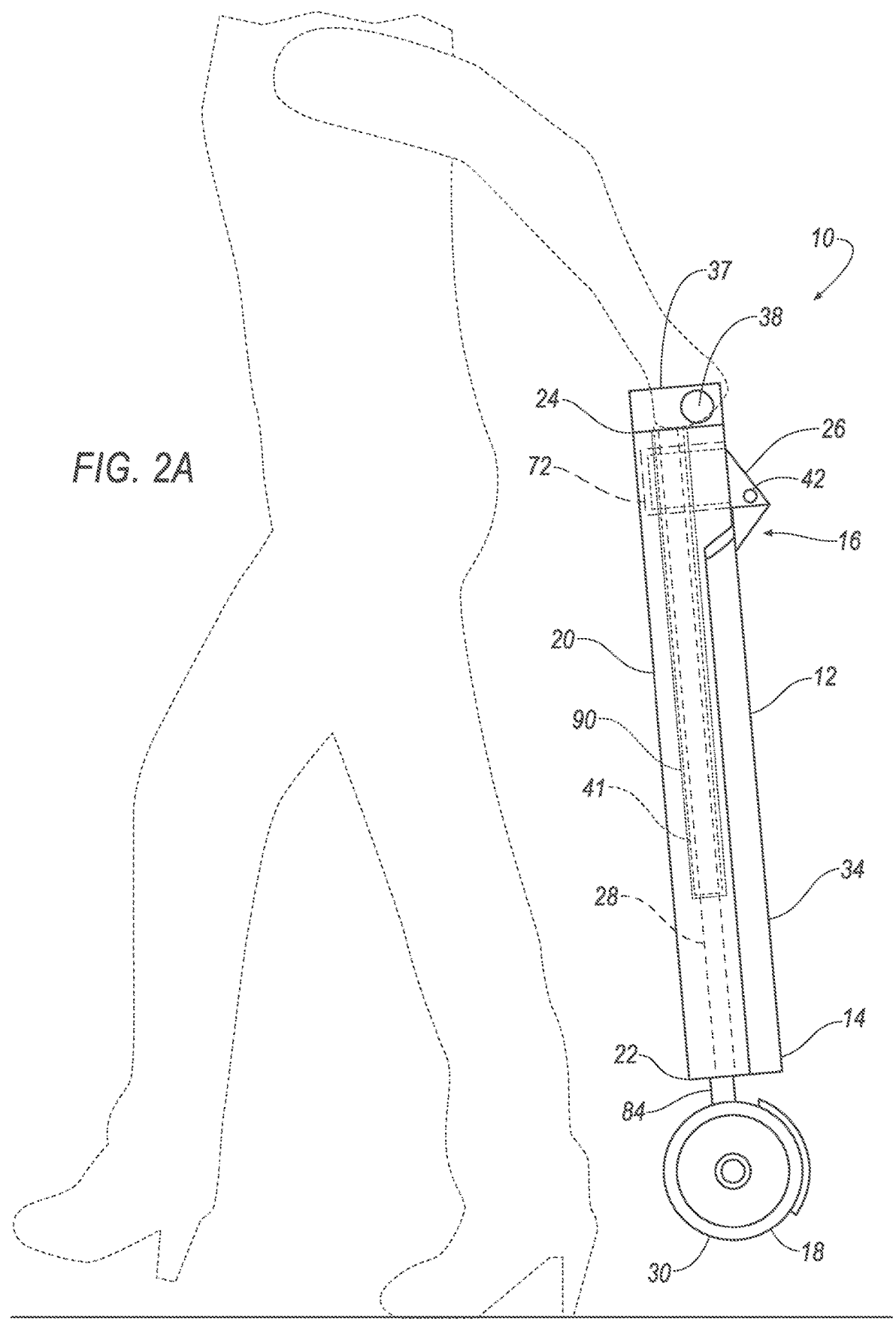
FIG. 2A is a perspective view of the scooter of FIG. 1 in a "Carry" position.
Figure 2B:
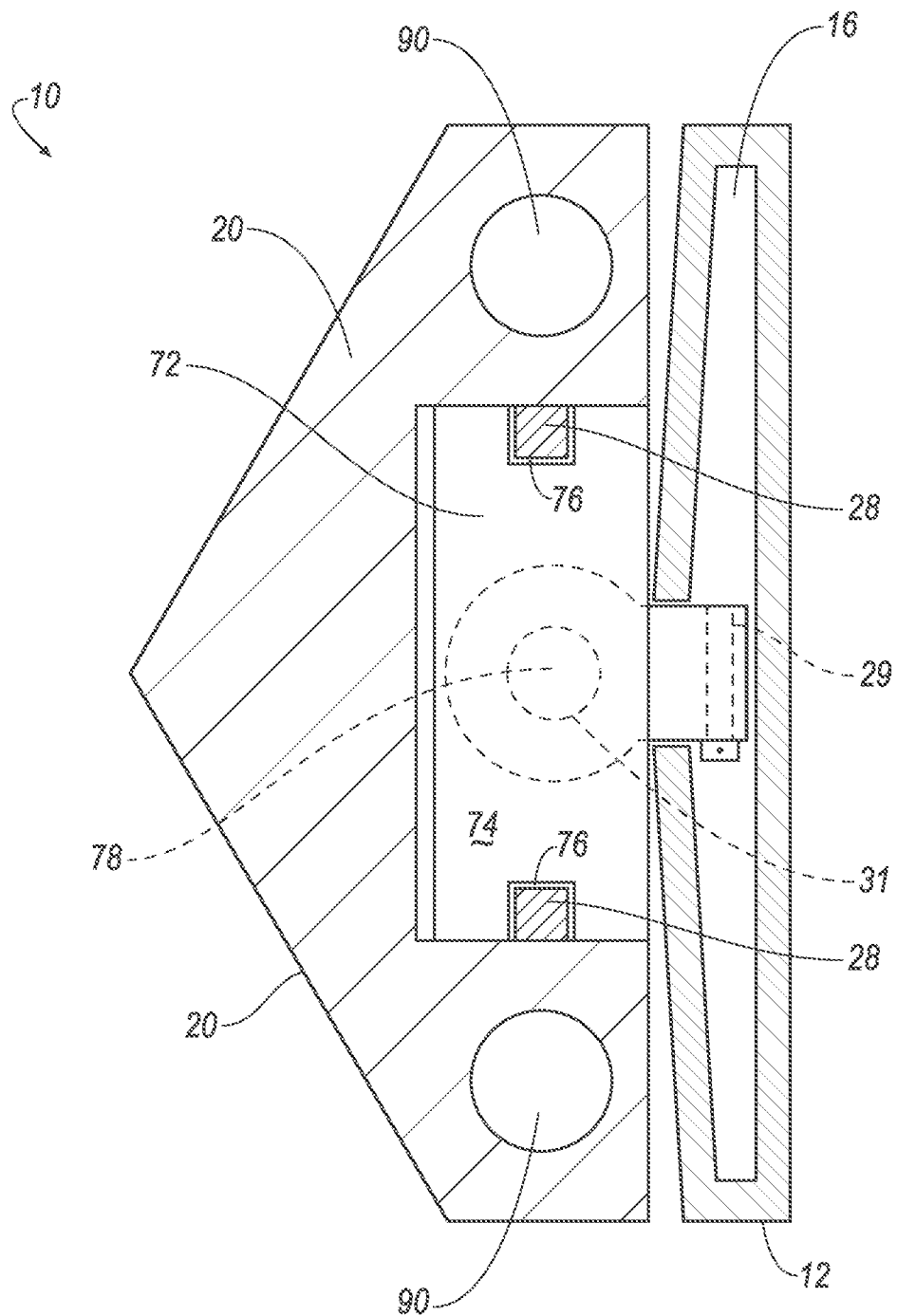
FIG. 2B is a top view of the scooter of FIG. 2A.
Figure 3:
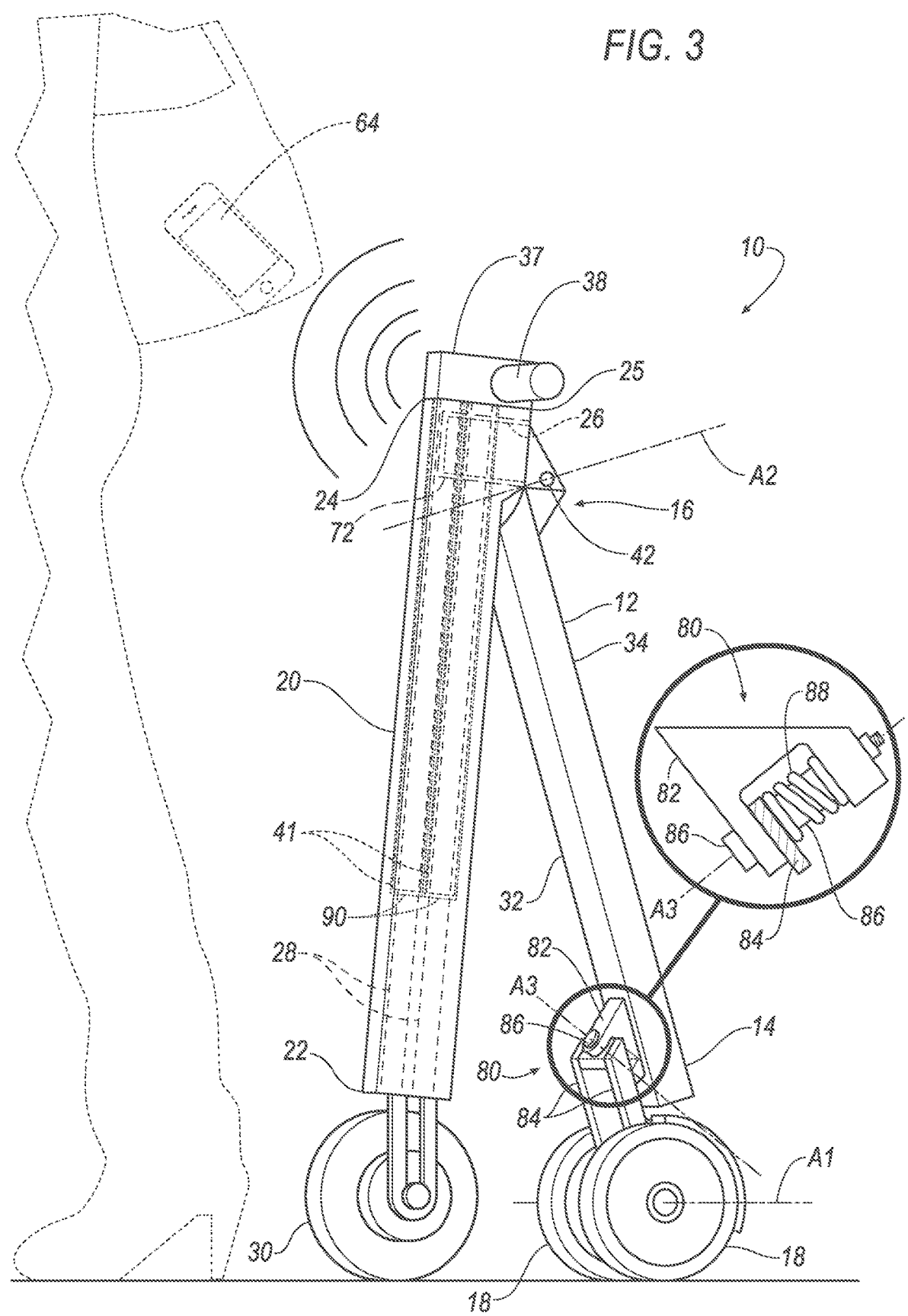
FIG. 3 is a perspective view of the scooter of FIG. 1 in a "Follow" mode.

In one example shown in FIGS. 1-3, the lower body 12 of the scooter 10 may include the bottom surface 32 and the top surface 34. Two rear wheels 18 can be rotatably mounted to the first end 14 of the lower body 12. The rear wheels 18 may rotate on the ground surface as the scooter 10 moves forward or backwards. The rear wheels 18 may rotate around an axis A1. The user may stand with one foot or two feet on the top surface 34 of the lower body 12. In order to avoid the user's foot slipping off the top surface 34, the top surface 34 may include grooves, a rough surface, and or other materials or structures to increase friction between the top surface 34 and a footwear of the user, thereby reducing the risk of slippage.

As shown in FIG. 1, the rear wheels 18 may be mounted to the lower body 12 bottom surface 32 via a wheel holder assembly 80. The wheel holder assembly 80 may include a base 82 mounted to the lower body 12, e.g., bottom surface 32, a fork 84 pivotably coupled to the base 82 with a pin 86, and a spring 88, e.g., a helical spring, maintaining an axis A1 of the rear wheels 18 parallel to the lower body 12 bottom surface 32. Additionally or alternatively, the helical spring 88 may extend around the pin of the wheel holder assembly.

The wheel holder assembly 80 typically facilitates contact of both rear wheels 18 with the ground surface, e.g., when the scooter 10 negotiates a sharp curve or rides on a rough surface. Such continuous contact with the ground surface may give the user a feeling of more comfort or stability. For example, when, the scooter 10 negotiates a sharp curve or rides on a rough surface, the fork 84 may pivot about an axis A3 relative to the base 82. The axis A3 may be transverse to the lower body 12 bottom surface. Alternatively, the axis A3 may be parallel to the lower body 12 bottom surface 32. The spring 88 may be attached to the fork 84 and the base 82, e.g., placed around the pin 86. The spring 88 may be in an equilibrium state when the axis A1 is substantially parallel to the lower body 12 bottom surface 32, e.g., when a first distance D1 of the first rear wheel 18 to the lower body 12 bottom surface 32 and a second distance D2 of the second rear wheel 18 to the lower body 12 bottom surface 32 are substantially equal. By pivoting the fork 84 about the axis A3 in either direction, i.e., the spring being in the tensioned state when the first distance D1 and the second distance D2 are unequal, the spring 88 is in a tensioned state. When the spring 88 is in the tensioned state, the spring 88 applies a torque to the fork 88 which is relative to an amount of rotational displacement of the fork 88 with respect to the base 82.

Figure 1B:
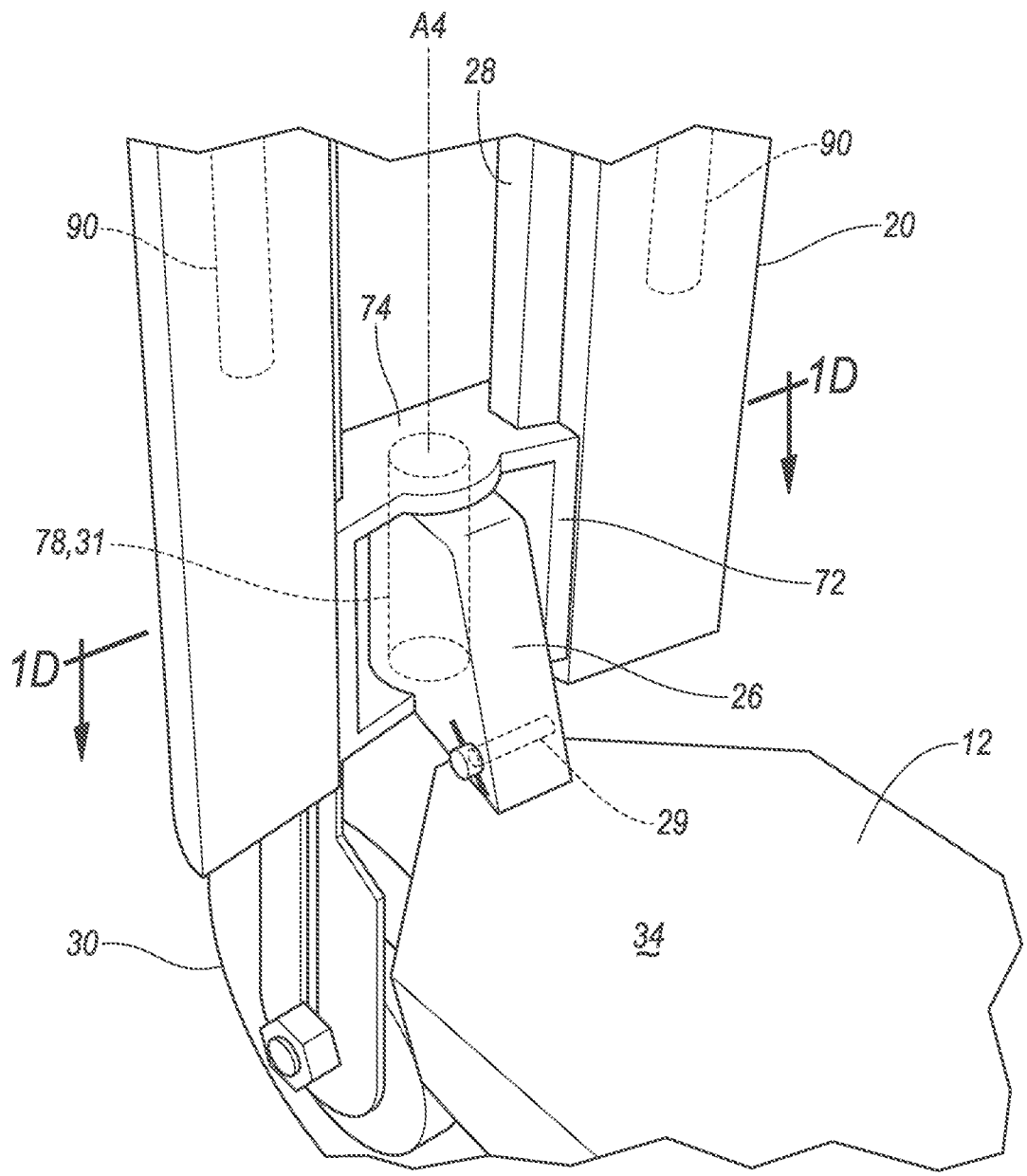
FIG. 1B is detail perspective view of a portion of the scooter of FIG. 1A.
Figure 1C:
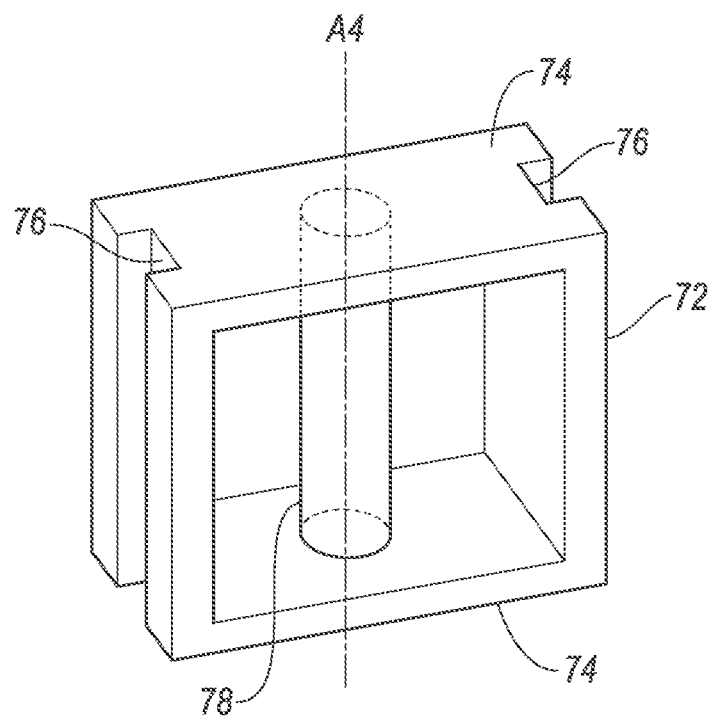
FIG. 1C is a perspective view of a sliding member of the scooter of FIG. 1A.
Figure 1D:
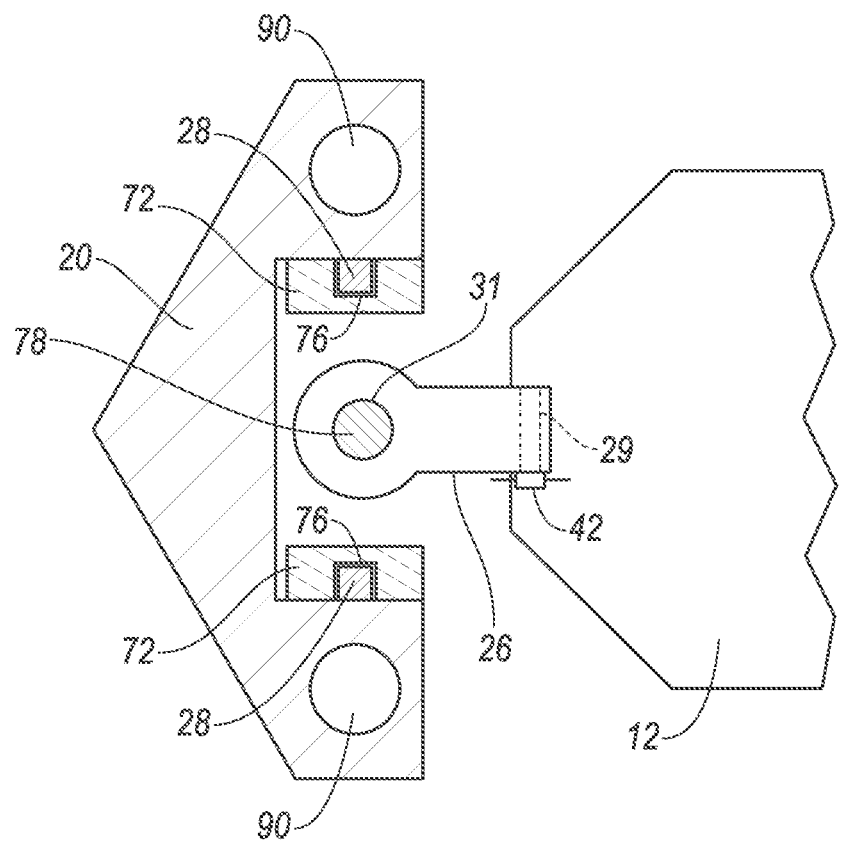
FIG. 1D is a cross section of a front body and a sliding element of the scooter of FIG. 1A.
Figure 1E:
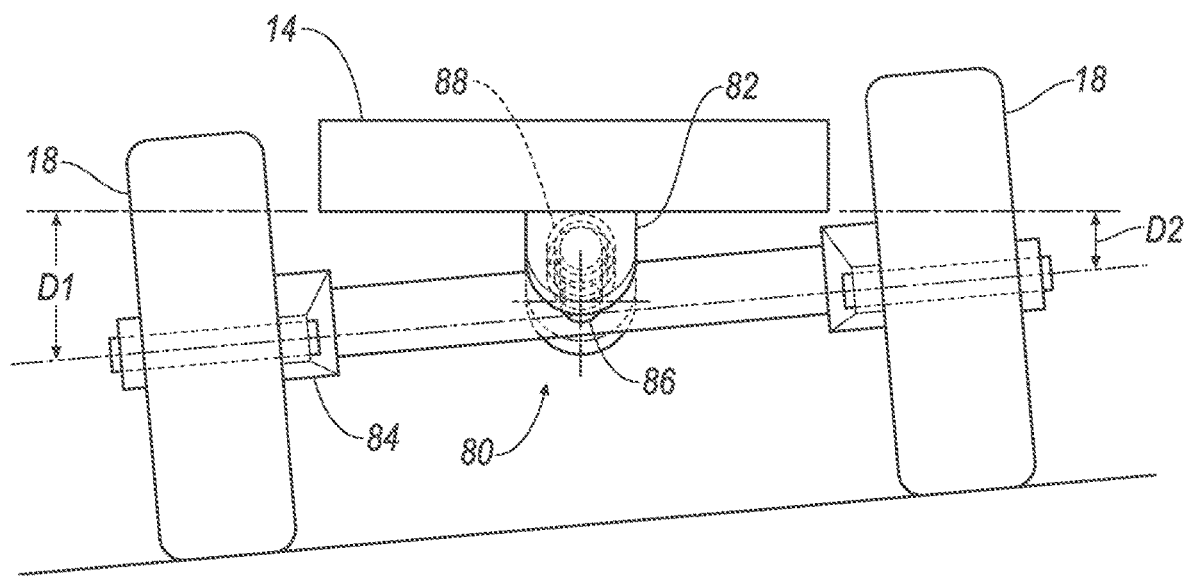
FIG. 1E is a detail perspective view of a portion of the scooter of FIG. 1A while negotiating a curve.

As shown in FIGS. 1A, 1B, and 1D, the front body 20 includes the upper end 24 and the lower end 22. FIG. 1D is a cross section along a plane DD shown in FIG. 1B. The lower end 22 of the front body 20 may support the front wheel 30, e.g., by bearings (not shown) in a known manner. The front wheel 30 may rotate on the ground surface as the scooter 10 moves forward or in reverse. Additionally, a handlebar 38 may be mounted to an upper body 37 of the scooter 10. The upper body 37 is mounted via one or more elongated members 41 to the front body 20. The elongated members 41 are telescopically retractable into one or more holes 90 of the front body 20. It will be understood that various mechanisms for holding and releasing the elongated member 41 at various positions, e.g., various heights, within the front body 20, could be implemented. The user may hold the handlebar 38 while riding the scooter 10.

The front wheel 30 is rotatably mounted to the front body 20 lower end 22 and the front body 20 can be pivotable relative to the lower body 12 about an axis A4 transverse to the lower body 12, e.g., top surface 34. With such pivoting, the user may steer the scooter 10 to a right or a left direction, e.g., by holding the handlebars 38 and applying a torque about the axis A4. The front body 20 may be pivotably coupled to the lower body 12 via a linear slide 72 and an attachment member 26, as discussed below.

With continued reference to FIG. 1, the scooter 10 includes a guide 28, such as T-slots or linear bushings, extending along the front body 20, e.g., from the lower end 22 to the upper end 24. The guide 28 may be mounted to or within the front body 20 and may extend at least partially from the front body 20 lower end 22 to the front body 20 upper end 24. The scooter 10 may include a linear slide 72 movably engaged with the guide 28.

The linear slide 72 may have a hollow rectangular shape, as best shown in FIG. 1C, including two ends 74, a rod 78 disposed between the two ends 74, and one or more grooves 76. The linear slide 72 may be slideably engaged with the guide 28, e.g., via the grooves 76. The linear slide 72 may slide between the front body 20 lower end 22 and the upper end 24. The linear slide 72 may be formed of TEFLON™ or any other suitable material. The front body 20 is pivotably mounted to the lower body 12 via the attachment member 26.

The scooter 10 includes the attachment member 26 disposed between the linear slide 72 and the lower body 12. The attachment member 26 may include an opening 29, a bore 31, and a pin 42 extending through the bore 31 and pivotably coupling the attachment member 26 to the lower body 12. The lower body 12 may pivot about an axis A2 relative to the attachment member 26. The attachment member 26 bore 31 may be pivotably engaged with the linear slide 72 rod 78, i.e., the attachment member 26 pivots about the linear slide 72 rod 78. Therefore, the linear slide 72 may pivot about the axis A4 relative to the attachment member 26. Additionally, the axes A2 and A4 may be transverse, e.g., perpendicular. Further, the attachment member 26 may move along the guide 28 via sliding movements of the linear slide 72 along the guide 28.

The scooter may include an upper body 37 coupled to the front body 20 via one or more elongated members 41. In this way, the front body 20 slideably holds the elongated members 41. The scooter 10 may include one or more handlebars 38 attached to the upper body 37.

As mentioned above, the scooter 10 can be switched between three configurations, sometimes referred to as modes. These include the Go mode, as shown in FIG. 1, the Carry mode, as shown in FIG. 2, and the Follow mode, as shown in FIG. 3.

As shown in FIG. 1, the Go mode includes scooter parts moved to positions to allow the scooter 10 to be ridden. In the Go mode, the linear slide 72 and the attachment member 26 may be adjacent the front wheel 30, i.e., positioned so as to be in contact with a surface of the front body 20 lower end 22. Alternatively, "adjacent" means at an end of the guide 28 nearest to the front body 20 lower end 22, if the guide 28 end is not coterminous with the front end 20 lower end 22. The user may ride and steer the scooter 10 on the ground surface in the Go mode using the handlebar 38.

As shown in FIG. 2A-2B, the user may carry the scooter 10 in the Carry mode. In the Carry mode, the rear wheel(s) 18 are positioned proximate to, e.g., a gap between the front wheel 30 and each of the rear wheels 18 is less than 10 cm, the front wheel 30. In the Carry mode, the attachment member 26 and the linear slide 72 are adjacent to the front body 20 upper end 24, i.e., the attachment member 26 and the linear slide 72 are positioned as to be in contact with a surface of the front body 20 upper end 24. Additionally, in the Carry mode, the upper body 37 can touch the front body 20 upper end 24 or be disposed within a few millimeters, e.g., 5 mm, of the front body 20 upper end 24 while the elongated members 41 are retracted within the front body 20. Further, the handlebars 38 can be folded down, e.g., touching the front body 20. When in the Carry mode, the user may hold the handlebar 38 to carry the scooter 10. Alternatively the user may hold the front body 20 while carrying the scooter 10 horizontally. When the scooter 10 has two rear wheels 18, the front wheel 30 may be disposed between the two rear wheels 18, when the scooter 10 is in in the Carry mode. Additionally, to reduce weight and/or improve the comfort of the user while carrying the scooter 10, the scooter 10 may be formed of carbon fiber material or any other suitable light weight material.

As shown in FIG. 3, when the user is not riding the scooter 10 and also not carrying the scooter 10, the scooter 10 can be placed in the Follow mode. As discussed below with respect to FIGS. 8-11, the scooter 10 may include an electric motor 44. Such motor 44 or the like allows the scooter 10 to move on the ground surface, e.g., in the Follow mode. In the Follow mode, the scooter 10 parts are moved to a position such that the attachment member 26 and the linear slide 72 are away from the front wheel 30 such that they are substantially coterminous with the front body 20 upper end 24. In the Follow mode the bottom surface 32 may substantially face the front body 20. Additionally, in the Follow mode, the upper body 37 can be adjacent the front body 20 upper end 24 while the elongated members 41 are retracted within the front body 20. The Follow mode can advantageously reduce an amount of space occupied by the scooter 10, which may be beneficial in a crowded walking area.

Figure 4:
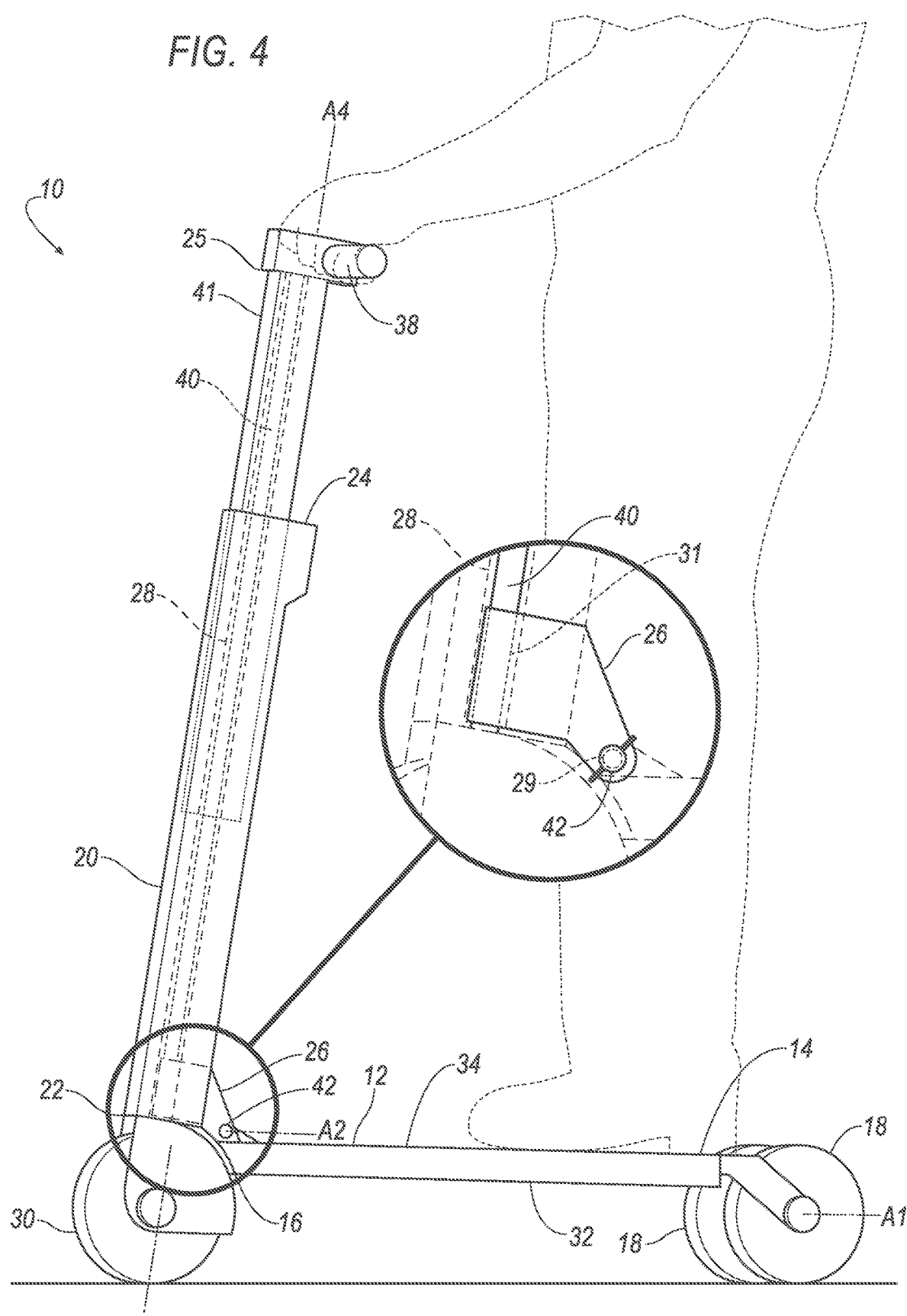
FIG. 4 is a perspective view of another example scooter in a "Go" position.

FIG. 4 is another example of a scooter 10' in which like elements have like numbers, and to which the above explanation applies. Variations in elements discussed above are designated with a "prime" symbol, e.g., the scooter 10'. The scooter 10' differs from the scooter 10 in certain respects. For example, in order to steer the scooter 10, the front body 20 pivots relative to the lower body 12 while the front wheel 30 is rotatably mounted to the front body 20. However, in the scooter 10' of FIG. 4, the steering column 40 is rotatably disposed in the front body 20 and is mounted to the front wheel 30, i.e., the front wheel 30 can pivot relative to the front body 30. Additionally, in the scooter 10, the linear slide 72 is disposed between the attachment member 26 and the guide 28. The linear slide 72 moves along the guide 28 while the attachment member 26 is pivotably attached to the linear slide 72 rod 78. However, in the scooter 10', the guide 28 defines an interior chamber to hold the attachment member 26 while the attachment member 26 can slide along the guide 28.

Figure 5A:
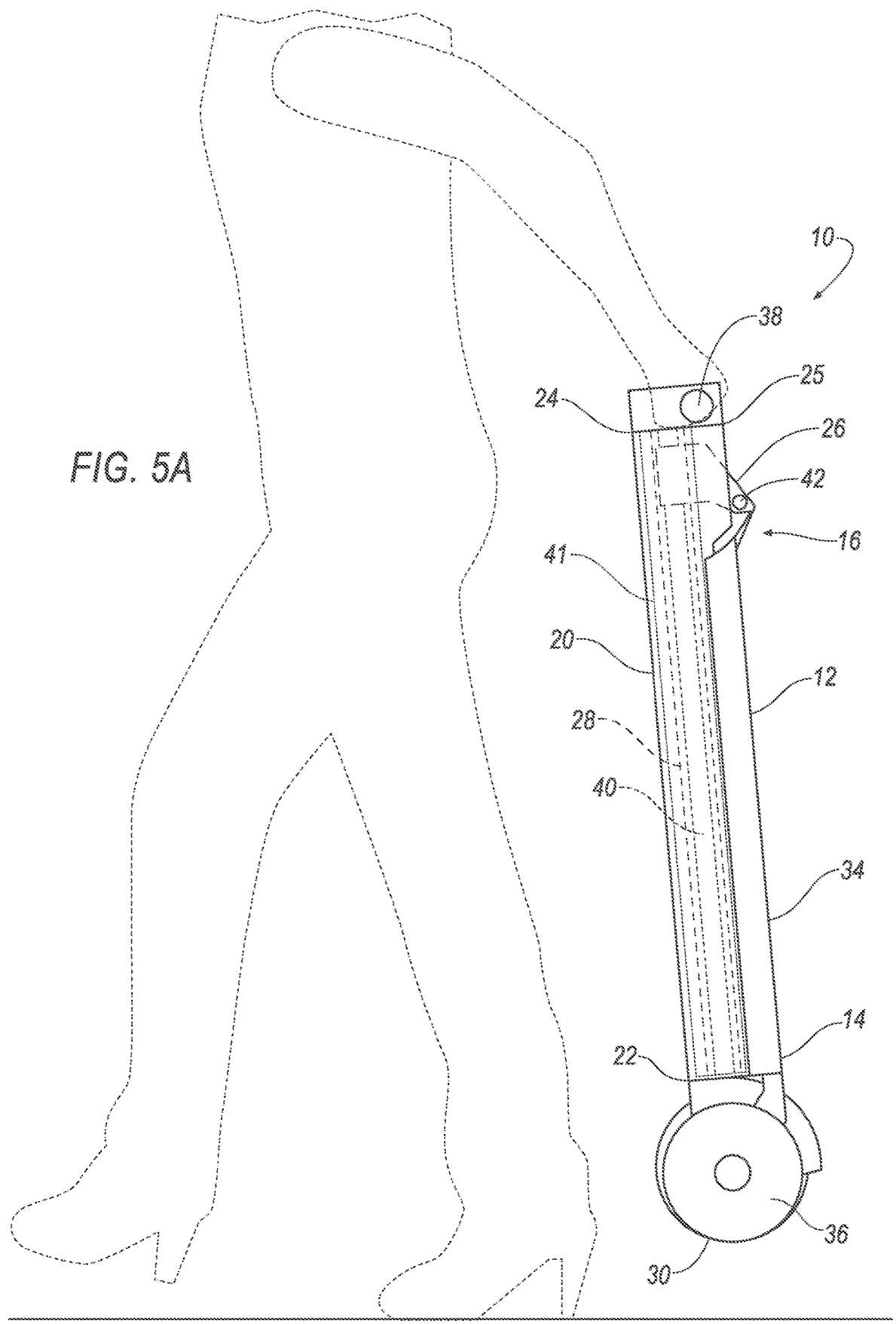
FIG. 5A is a perspective view of the scooter of FIG. 4 in a "Carry" position.
Figure 5B:
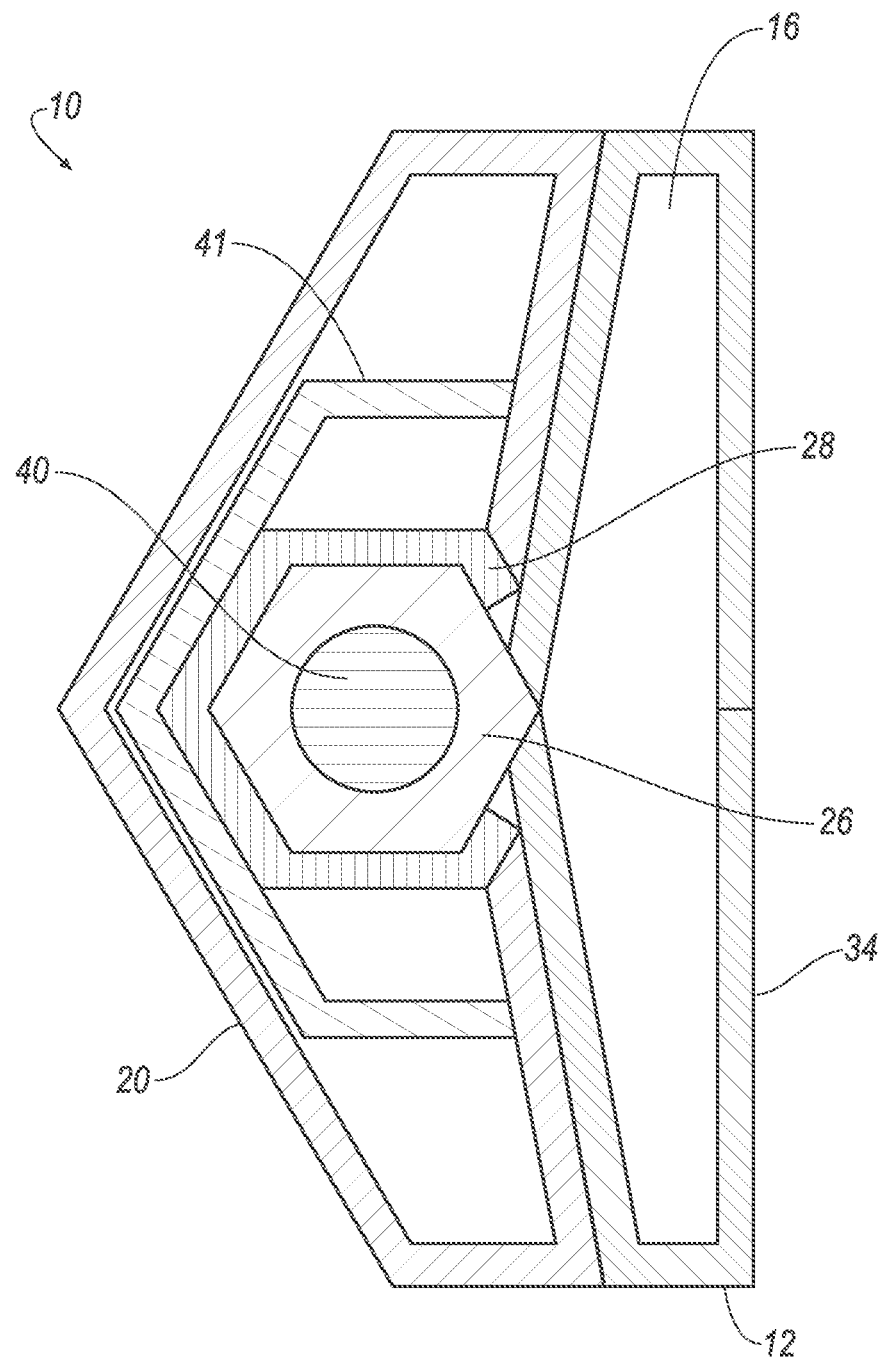
FIG. 5B is a top view of the scooter of FIG. 5A.
Figure 6:
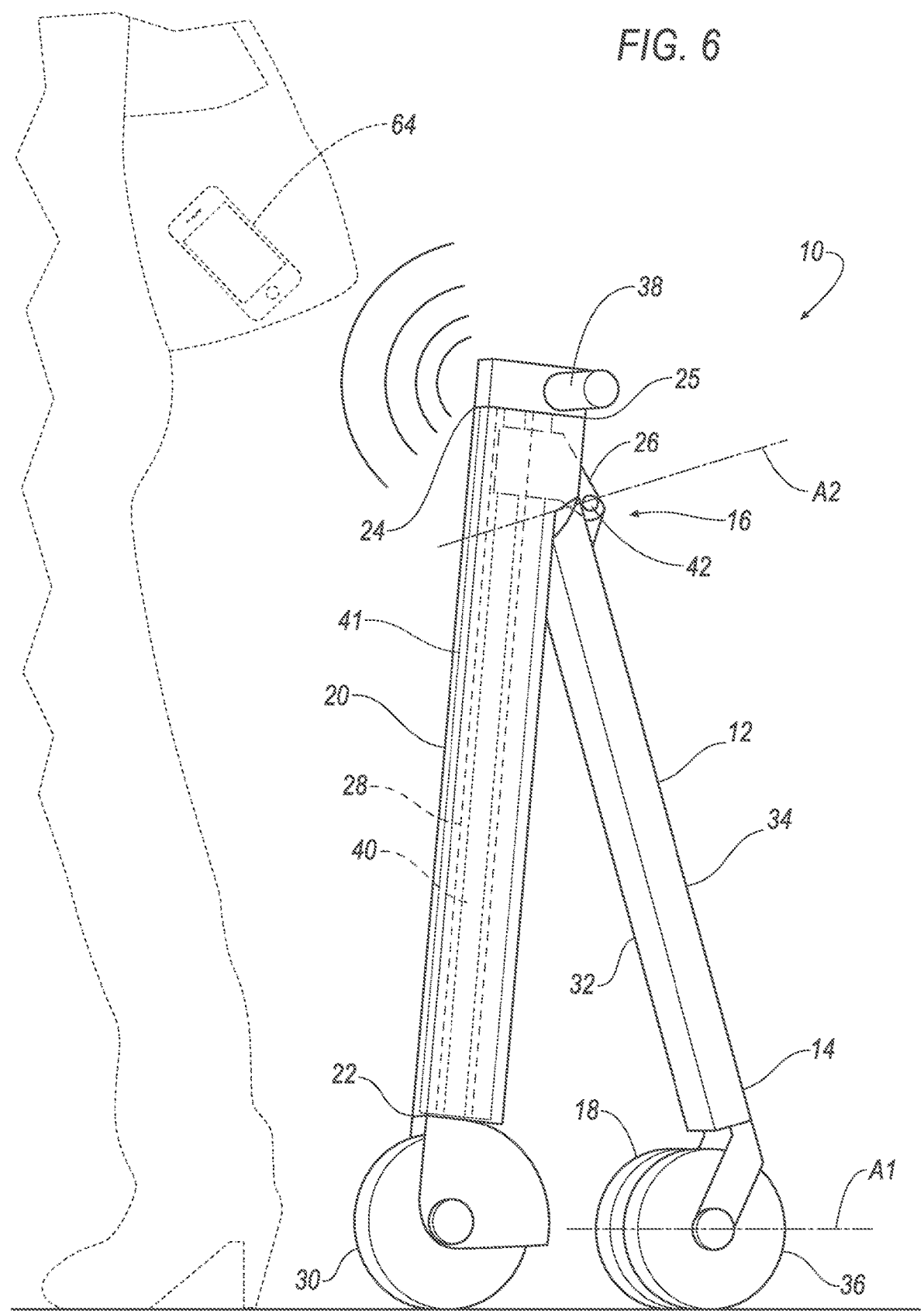
FIG. 6 is a perspective view of the scooter of FIG. 4 in a follow mode.

As shown in FIGS. 4-6, the lower body 12 of a scooter 10' may include the bottom surface 32 and the top surface 34. One or more rear wheels 18 can be rotatably mounted, e.g. via bearings, to the first end 14 of the lower body 12. The rear wheels 18 may rotate on the ground surface as the scooter 10' moves forward or backwards. The rear wheels 18 may rotate around an axis A1. The user may stand with one foot or two feet on the top surface 34 of the lower body 12. In order to avoid the user's foot slipping off the top surface 34, the top surface 34 may include grooves, a rough surface, and/or other materials or structures to increase friction between the top surface 34 and a footwear of the user, thereby reducing the risk of slippage. Additionally, the scooter 10' may include dampers connecting the rear wheels to the lower body 12. The dampers may reduce a disturbance on the user, when the user rides over an imperfection of the ground surface, e.g., a pothole.

As shown in FIG. 4, the front body 20 includes the upper end 24 and the lower end 22. The scooter 10' may include a handlebar 38 mounted via an elongated member 41 to the front body 20. The elongated member 41 is telescopically retractable into the front body 20. The front wheel 30 may be rotationally mounted to the front body 20 lower end 22 while the front wheel 30 may pivot about the axis A4 relative to the front body 20. In other words, in this example, discussed below, the scooter 10' may steer to the right or the left direction by pivoting the front wheel 30 about the axis A4 relative to the front body 20.

With continued reference to FIG. 4, the scooter 10' includes a steering column 40. The steering column 40 may extend from the upper end 24 to the lower end 22 of the front body 20. The steering column 40 may extend downwardly form the handlebar 38 within the front body 20, allowing the steering column 40 to rotate relative to the front body 20. To allow the steering column 40 to telescopically retract into the front body 20 along with the guide 28 and elongated member 41, the steering column 40 can have two sub-sections, one sub-section sliding into another sub-section. The steering column 40 is then rotatably attached to the front wheel 30 on one end of one sub-section and connected to the handlebar 38 on one end of the other sub-section. The steering column 40 enables the user to steer the scooter 10' in different directions using the handlebar 38. The steering column 40 may be mounted to the front body 20 with a sleeve, bearing, or any other construction which enables a rotational movement of the steering column 40 relative to the front body 20; a specific example configuration of an attachment member 26 and guide 28 holding the steering column 40 in place is described further below.

The steering column 40 may be in an extended position when the user rides the scooter 10', or in a retracted position. Additionally, the height of the steering column 40 may be adjustable in different extended positions to accommodate users with different heights, i.e., a length of the portion of the sub-section sliding out of the other sub-section may be adjustable, e.g. by a quick release lock.

The scooter 10' includes the guide 28, which may be enclosed by an elongated member 41, and may further have an interior shape provided to snugly accommodate the attachment member 26. The guide 28 may be mounted to or within the front body 20, may extend at least partially from the front body 20 lower end 22 to the front body 20 upper end 24. As just mentioned, the guide 28 defines an interior chamber to slideably hold an attachment member 26, the guide 28 having a top end that abuts the handlebar 38, and is close to or substantially at the front body 20 upper end 24, when the elongated member 41 is in a retracted position (FIGS. 5 and 6), and a bottom end of the guide 28.

The attachment member 26 has a bore 31 having a substantially circular cross section to engage with the steering column 40. The attachment member 26 bore 31 may extend longitudinally inside the guide 28 for a relatively small fraction, e.g., one-tenth or less, of the length of the guide 28, e.g., for only a few centimeters, and can slide longitudinally inside the guide. That is, the steering column 40 extends through the bore 31 of the attachment member 26. The attachment member 26 may have a hexagonal cross section. Alternatively, other cross section shapes may be used for the attachment member 26, e.g. circular, elliptical.

The steering column 40 may rotate relative to the attachment member 26 and the guide 28. In order to make steering the scooter 10' more comfortable for the user, friction between the steering column 40 and an interior surface of the bore 31 of the attachment member 26 may be reduced, for example, by friction-reducing coatings such as are known, e.g., like TEFLON™, lubricants, or other materials that may be known to reduce friction and/or provide lubrication.

The attachment member 26 may be secured to lower body 12 second (or front) end 16 by a pin 42 secured in a substantially circular opening 29 of the attachment member 26, whereby the attachment member 26 is pivotably fixed to the second end 16 of the lower body 12. The attachment member 26 may slide within an interior surface of the guide 28, i.e., the attachment member 26 may slide along a longitudinal axis of the guide 28. Thereby, the lower body 12 may be folded to a position adjacent or substantially abutting the front body 20, i.e., the lower body 12 bottom surface 32 is disposed between the lower body 12 top surface 34 and the front body 20. This may be useful to ease carrying of the scooter 10' when the scooter 10' is not being used for riding. In order to make the attachment member 26 slide within the guide 28 in a manner that is comfortable for the user, i.e., smoother, a friction between the guide 28 and the attachment member 26 may be reduced by, for example, coatings like TEFLON' on the guide 28 and/or attachment member 26. The attachment member 26 may be connected to the second end 16 of the lower body 12 by the pin 42, and the lower body 12 may pivot about an axis A2.

The scooter 10' can be switched between various configurations, sometimes referred to as modes. These include the Go mode, as shown in FIG. 4, the, the Carry mode, as shown in FIG. 5, and the Follow mode, as shown in FIG. 6.

As shown in FIG. 4, the lower body 12 bottom surface 32 faces away from the upper end 24 when the scooter 10' is in the Go mode, or in other words when the user rides the scooter 10' on the ground surface in the Go mode, the bottom surface 32 faces the ground surface. In the Go mode the attachment member 26 may be adjacent the front wheel 30.

As shown in FIG. 5, in the Carry mode, the rear wheel(s) 18 are positioned proximate to or substantially abutting the front wheel 30, e.g., a gap between the front wheel 30 and each of the rear wheels 18 is less than 10 cm, and the attachment member 26 is adjacent the upper end 24, i.e., the attachment member is positioned at the front body 20 upper end 24. The user may hold the handlebar 38 to carry the scooter 10'. Alternatively the user may hold the front body 20 while carrying the scooter 10' horizontally. Additionally, in the Go mode, the elongated member 41 or a portion thereof may slide into the front body 20 may be disposed in the front body 20, in order to maintain mechanical integrity between the front body 20 and the elongated member 41. When the scooter 10' has two rear wheels 18, in the Carry mode, the front wheel 30 may be disposed between the two rear wheels 18.

As shown in FIG. 6, in the Follow mode the bottom surface 32 may substantially face the front body 20. The Follow mode advantageously can reduce an amount of space occupied by the scooter 10', which may be beneficial in a crowded walking area. The attachment member 26, having slid upward within the guide 28 away from the front wheel 30. The elongated member 41 may partially or completely slide into the front body 20, when the scooter is in the Carry mode.

As mentioned above, in the Follow mode, the scooter 10' may be powered, e.g., by an electric motor 44 (As discussed below with respect to FIGS. 8-11, the scooter 10' may include an electric motor 44. Such motor 44 or the like allows the scooter 10' to move on the ground surface.) In the Follow mode, scooter 10' parts are moved to a position such that the attachment member 26 is away from the front wheel 30.

Further features of a scooter 10 are now discussed with respect to FIGS. 7-11. Note that these features could also be implemented with respect to other examples, such as the example scooter 10' discussed with respect to FIGS. 4-6, etc.

Figure 7:
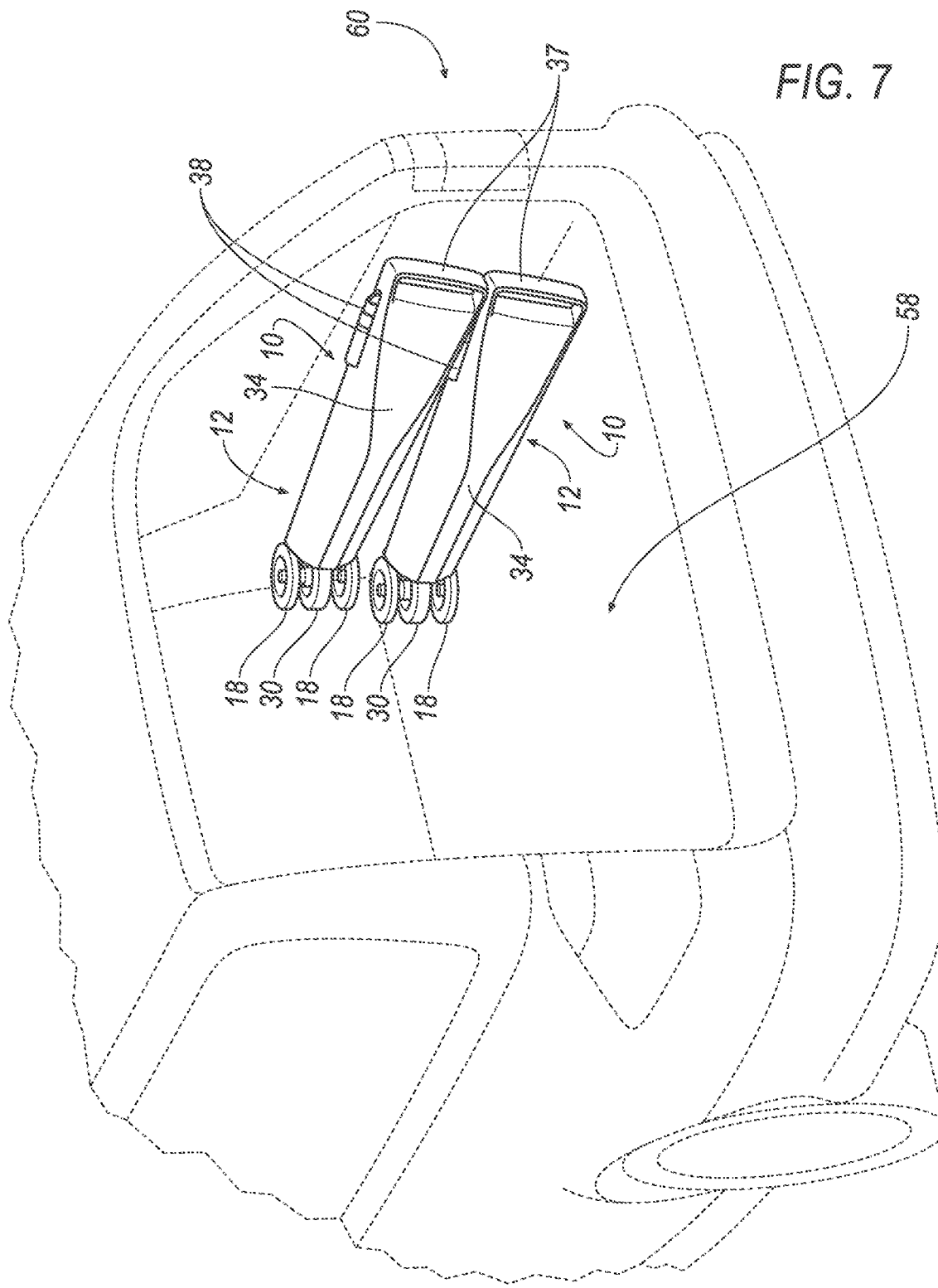
FIG. 7 is a perspective of scooters of FIGS. 1 and 4 in the "Carry" mode stored in a trunk.

As shown in FIG. 7, an example scooter 10 according to either FIG. 1 or 4, can be disposed in a trunk of a vehicle. In order to save space while stored in the trunk 58, the handlebar 38 may be folded down to be placed adjacent the front body 20, i.e., touching the front body 20, and the elongated member(s) 41 may be retracted in the front body 20. As discussed below, a powered scooter 10 may be charged while stored in a trunk 58 of a vehicle 60.

Figure 8:
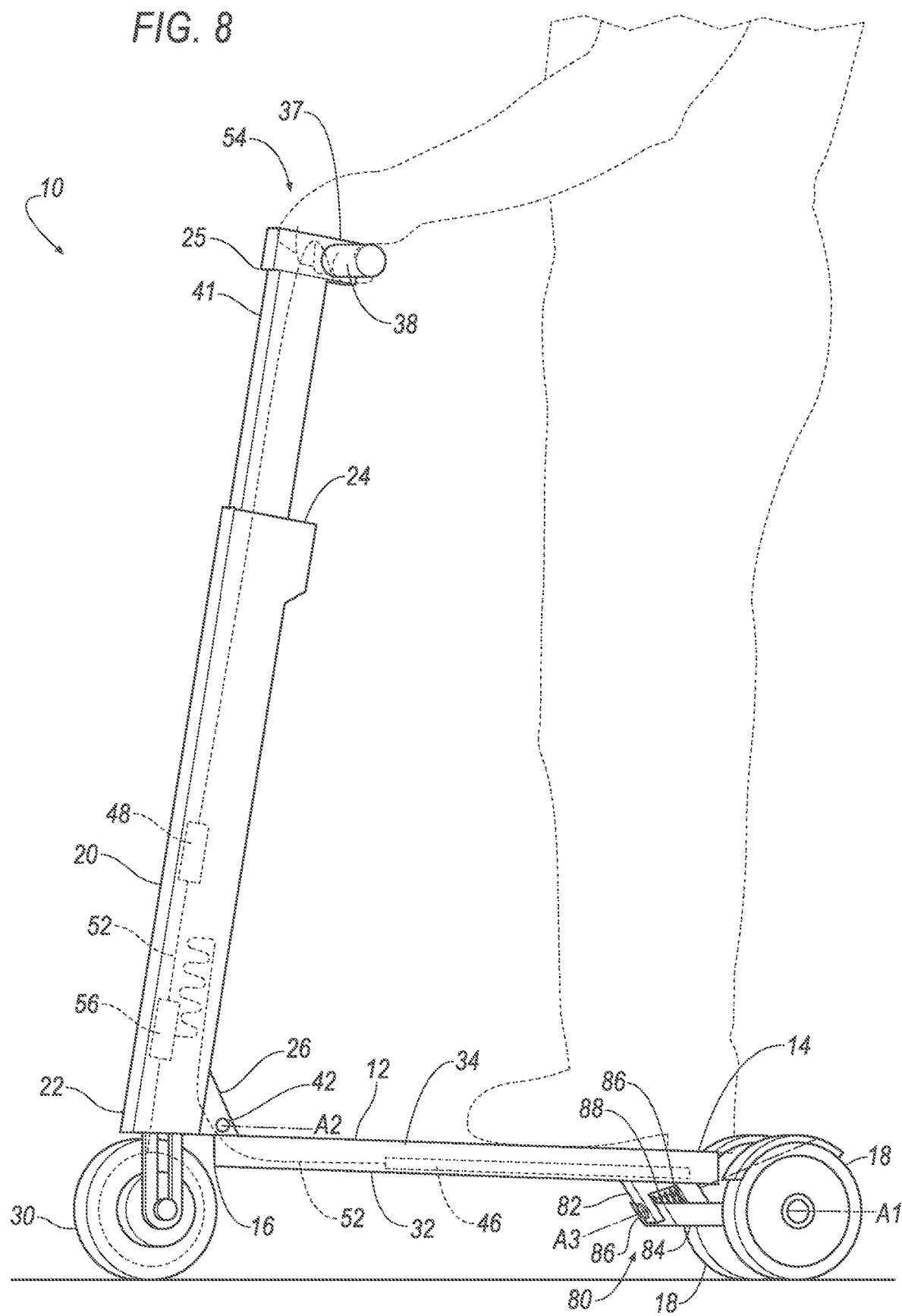
FIG. 8 is a perspective view of the scooters of FIGS. 1 and 4 in a "Go" position, illustrating various electrical, electronic, and/or control components.

As shown in FIG. 8, an example scooter 10, e.g., according to either FIG. 1 or 4, may be self-propelled, i.e., relying on a motor 44 or actuator included in the scooter 10 rather than relying on the user to push the scooter 10. For example, the electric motor 44 may be an in-wheel electric motor mounted inside the front wheel 30 of the scooter 10 and driveably coupled to the front wheel 30. Alternatively or additionally, the electric motor 44 may be a conventional electric motor mounted to the front body 20 and coupled to the front wheel 30. The energy required by the electric motor 44 may be provided by a battery 46 mounted to the lower body 12 of the scooter 10 or elsewhere in the scooter 10. Alternatively or additionally, other electric energy sources may be used, e.g., solar panels mounted to the scooter 10, external battery carried by the user and electrically connected to the scooter 10 or any other way.

Figure 9:
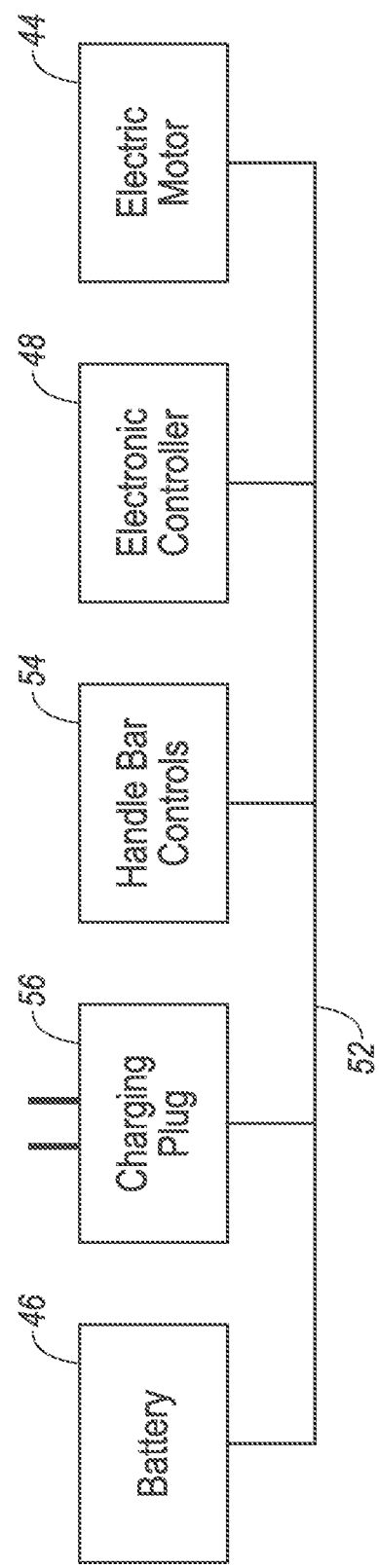
FIG. 9 is a block diagram showing sub-components of example electronic controller installed in the scooter of FIGS. 1 and 4.
Figure 10:
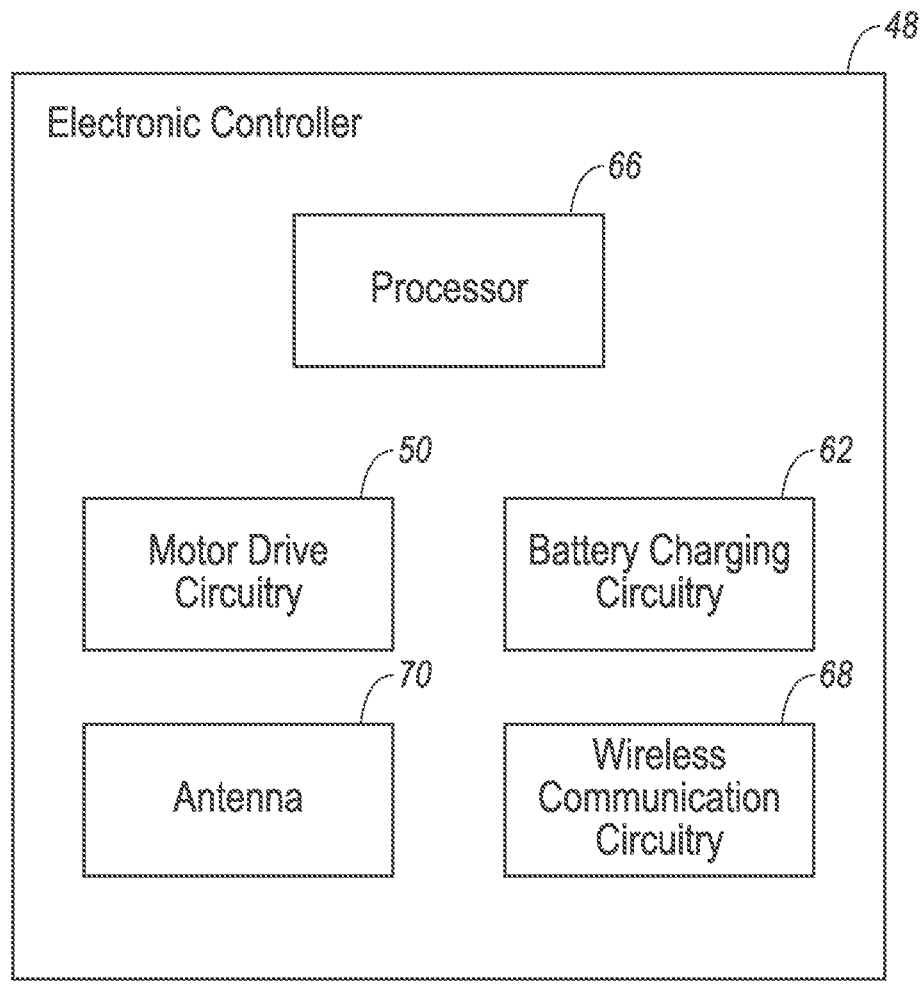
FIG. 10 is a block diagram showing sub-components of an example electronic controller installed in the scooter of FIGS. 1 and 4.

FIG. 8 illustrates various electrical, electronic, and/or control components of the scooter 10, and, for ease of illustration, omitting certain elements, such as the linear slide 72 and attachment member 26. With reference to FIGS. 9 and 10, the scooter 10 may have an electronic controller 48 mounted to the front body 20 or elsewhere having a processor 66 and a memory, the memory storing instructions executable by the processor 66 to control a speed, acceleration, and/or deceleration of the scooter 10. The scooter 10 may include handlebar controls 54, e.g., mounted to the handlebar 38, to enable user to give inputs to the electronic controller 48 to accelerate or to decelerate the scooter 10. The electronic controller 48 may include a motor drive circuitry 50 to control the speed of the electrical motor 44, e.g., a pulse width modulation circuitry. An electrical harness 52 including a plurality of wires may interconnect the battery 46, the electric motor 44, the electronic controller 48, and the handlebar controls 54. Additionally, the scooter 10 may include a charging plug 56 electrically connected to the electrical harness 52. The charging plug 56 may provide a possibility of charging the battery 46 of the scooter 10, for example, while the scooter 10 is stored in a trunk 58 of a vehicle 60 (as shown in FIG. 7). The electronic controller 48 may include a battery charging circuitry 62 to control the flow of electrical energy required for charging the battery 46. The processor 66 of the electronic controller 48 may be programmed to control a charging of the battery 46 when the scooter 10 is connected through the charging plug 56 to a power source, e.g. a vehicle battery.

In order to avoid a collision of the scooter 10 with an object on the road having a possibility of rapid deceleration is advantageous. The electronic controller 48 may be programmed to operate the electric motor 44 in a generator mode when the user requests a rapid deceleration. The electric motor 44 in the generator mode resists against the rotation of a rotor of the electric motor 44 and thereby may decelerate the scooter 10. This has the additional benefit that battery 46 may be charged during a deceleration. For example, the battery charging circuitry 62 and the electronic controller 48 program can provide a flow of energy to recharge the battery 46. Such regenerative braking is known, e.g., to support hybrid operation known from hybrid-electric vehicles. Additionally or alternatively, the scooter 10 may actuate one or more brakes electrically by using the handlebar controls 54. Alternatively, the brakes may be mechanically connected to a handlebar 38 using a wire transferring a force from the user to the brake.

Figure 11:
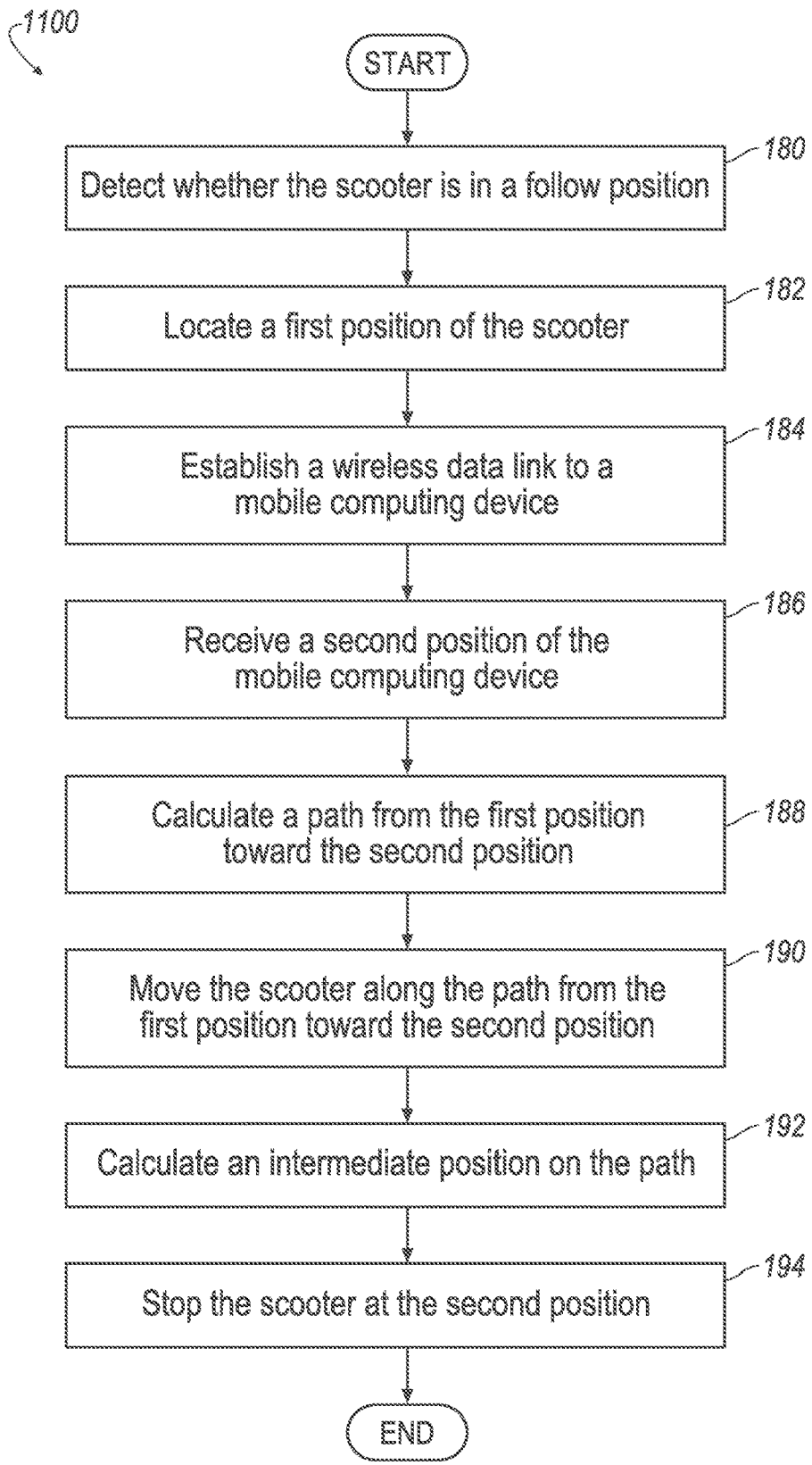
FIG. 11 is shows a flowchart of a method for the scooters of FIGS. 1 and 4 in the "Follow" position.

As set forth above, the scooter 10 in the Follow mode may move on the ground surface next to, in front of, or behind the user, without the user riding, or pushing or pulling, the scooter 10. A mobile computing device 64 may be carried by the user with a first positioning sensor, e.g., a global positioning sensor determining a global coordinate of the mobile computing device 64, and a scooter 10 with a second positioning sensor, e.g. a global positioning sensor or a location sensor determining a coordinate of the scooter 10 relative to the mobile computing device 64, a wireless communication circuitry 68, e.g. Bluetooth, and the processor 66 programmed to execute a following process as shown in FIG. 11. In other words, the mobile computing device 64 of the user device can communicate with the scooter electronic controller 48 to actuate the scooter motor 44 to cause the scooter 10 to move next to, behind, or in front of, the user.

Exemplary Process Flow

The process 1100 of FIG. 11 includes steps to detect whether the scooter is in the follow mode, receive a first position (e.g., geo-location using latitude and longitude coordinates as in known) of the scooter 10, establish a wireless data link to the mobile computing device 64, receive a second position of the mobile computing device 64, calculate a path from the first position to the second position, and move the scooter 10 along the path from the first position to the second position. To control the move of the scooter 10 along the path, the electronic control unit may implement various control methods, e.g., proportional integral derivative control, cascade control, fuzzy control, or any other suitable control method. In order to move the scooter 10 along the path, the control may need to actuate the scooter steering to cause the scooter 10 to a user's walking path, e.g., to follow a user's change of direction. The scooter 10 may accordingly include a step motor (not shown) or any other suitable mechanism connected to the electronic controller 48 through the electrical harness 52 to steer the steering column 40 based on a request received from the processor 66 to change the direction of moving of the scooter 10.

The user may prefer that the scooter 10 in the Follow mode moves ahead of the user due to various reasons, e.g., for security. In this case the processor 66 may be programmed to receive navigation information from the mobile computing device 64 and to receive commands from the mobile computing device 64 to accelerate, decelerate and steer toward a predetermined destination.

The scooter 10 in the Follow mode moving behind the user may additionally or alternatively include a second location sensor that is a camera mounted to the front body 20 of the scooter 10 connected through the electrical harness 52 with the electronic controller 48. Either a second processor in the camera or the processor 66 in the electronic controller 48 may be programmed to detect the user and calculate a position, e.g., geo-coordinates such as are known, of the scooter 10 relative to the user. The detection of the user may be done using a specific graphical pattern like a QR code on a clothing or accessories of the user or any other feature which enables the camera to distinguish the user from other people around the scooter 10.

The process 1100 as shown in FIG. 11 is for operating the scooter 10 in the Follow mode. For example, the processor 66 may be programmed according to the process 1100.

The process 1100 begins in the block 180, in which the processor 66 detects whether the scooter 10 is in a Follow mode.

Next, in the block 182, the processor 66 locates the first position of the scooter 10.

Next, in the block 184, the processor 66 establishes the wireless data link to the mobile computing device 64.

Next, in the block 186, the processor 66 receives the second position of the mobile computing device 64.

Next, in the block 188, the processor 66 calculates the path from the first position toward the second position.

Next, in the block 190, the processor 66 outputs a signal to the motor drive circuitry 50, e.g., a pulse width modulated pulse with a duty cycle of 50%, to move the scooter 10 along the path from the first position toward the second position.

As another example, the processor 66 may be further programmed to execute the blocks 192 and 194 to avoid a collision between the scooter 10 and the user, while following the user.

Next, in the block 192, the processor 66 calculates an intermediate position on the path, whose distance to the second position is at least equal to a minimum proximity threshold, e.g., 1 meter.

Next, in the block 194, the processor 66 sends a request to brake, e.g., an ON pulse, when the scooter 10 reaches the predetermined minimum proximity, i.e., the intermediate distance, threshold. The scooter 10 may move again after the user walks forward and the distance between the scooter 10 and the user exceeds the predetermined minimum distance. Following the block 194, the process 1100 ends.

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

What is claimed is:

1. A scooter comprising:
   a lower body having first and second ends;
   a rear wheel rotatably supported by the first end;
   an elongated front body having lower and upper ends;
   a guide fixed to the front body extending from the lower end to the upper end;
   an attachment member pivotably mounted to the second end of the lower body and engaged by the guide;
   a front wheel rotatably supported by the lower end; and
   a linear slide slideably engaged with the guide, wherein the linear slide is disposed between the attachment member and the guide.

2. The scooter of claim 1, wherein the linear slide is slideable between the lower end and the upper end of the elongated front body.

3. The scooter of claim 1, wherein the linear slide and the attachment member are pivotably coupled.

4. The scooter of claim 1, wherein the front body is pivotable about an axis transverse to a top surface of the lower body.

5. The scooter of claim 1, wherein the linear slide further comprises one or more grooves engaged with the guide, a top and a bottom, and a rod extending from the top to the bottom of the linear slide, wherein the attachment member is pivotably engaged with the rod.

6. The scooter of claim 5, wherein the attachment member is pivotable about a first axis of the rod of the linear slide.

7. The scooter of claim 6, wherein the attachment member includes a bore, and wherein the rod of the linear slide extends through the bore.

8. The scooter of claim 7, wherein the attachment member includes an opening, and wherein the lower body is pivotably coupled to the attachment member with a pin extending through the opening.

9. The scooter of claim 8, wherein the first axis of the rod of the linear slide and a second axis of the pin coupling the lower body to the attachment member are transverse.

10. The scooter of claim 1, wherein the scooter has a Go mode, a Follow mode and a Carry mode, the attachment member is adjacent the front wheel when the scooter in the Go mode, the attachment member is away from the front wheel when the scooter in the Follow mode, and the rear wheel is disposed adjacent the front wheel the attachment member is adjacent the upper end when the scooter in the Carry mode.

11. The scooter of claim 10, wherein the lower body further includes a bottom surface facing away from the upper end when the scooter in the Go mode, and the bottom surface faces the front body when the scooter is in the Carry mode.

12. The scooter of claim 1, further comprising a second rear wheel, the second rear wheel supported by the first end.

13. The scooter of claim 12, wherein the front wheel is disposed between the rear wheel and the second rear wheel in a Carry mode.

14. The scooter of claim 12, further comprising a wheel holder assembly supporting the rear wheel and the second rear wheel, wherein the wheel holder assembly further includes a base attached to a bottom surface of the lower body, and a fork supporting the rear wheel and the second rear wheel, wherein the fork is pivotably coupled to the base.

15. The scooter of claim 14, wherein the fork is pivotable about an axis transverse to the bottom surface of the lower body.

16. The scooter of claim 14, wherein the wheel holder assembly further includes a spring having an equilibrium state and a tensioned state, the spring being in the equilibrium state when a first distance of the rear wheel to the bottom surface of the lower body and a second distance of the second wheel to the bottom surface of the lower body are equal, and the spring being in the tensioned state when the first distance and the second distance are unequal.

17. The scooter of claim 16, wherein the wheel holder assembly further includes a pin pivotably coupling the fork to the base, and wherein the spring is a helical spring extending around the pin of the wheel holder assembly.

* * * * *